S. Y. BRADSTREET.
Safety Truck.

No. 77,248.

Patented April 28, 1868.

Witnesses
S. C. Kenion
C. A. Pettit

Inventor
S. Y. Bradstreet
By Munn & Co.
Attorneys

United States Patent Office.

S. Y. BRADSTREET, OF MONTICELLO, IOWA.

Letters Patent No. 77,248, dated April 28, 1868.

IMPROVED SAFETY-TRUCK.

*The Schedule referred to in these Letters Patent and making part of the same.*

TO ALL WHOM IT MAY CONCERN:

Be it known that I, S. Y. BRADSTREET, of Monticello, in the county of Jones, and State of Iowa, have invented a new and improved Safety-Truck; and I do hereby declare that the following is a full, clear, and exact description of the construction and operation of the same, reference being had to the accompanying drawings, making a part of this specification, in which—

Figure 1:
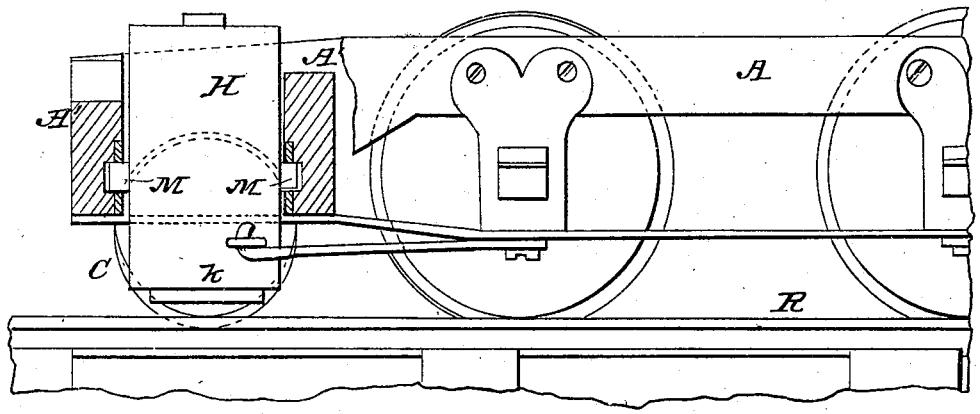
Figure 1 is a side elevation of a car with my truck attached, a portion of the frame being broken away.

This invention has for its object the prevention of railroad-cars from bouncing off the track, and consists in the employment of an auxiliary truck of peculiar construction, which guides the main trucks, and which cannot, by any ordinary obstructions, be thrown off of the rails.

In the drawings, A A' represent the frame of the car, and B B the wheels, and R R are the rails, upon which the car runs.

Figure 2:
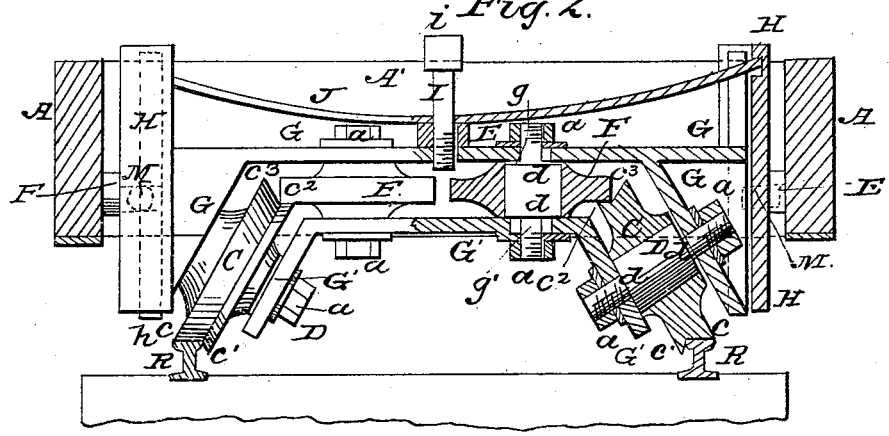
Figure 2 is a cross-section of the same.
Figure 3:
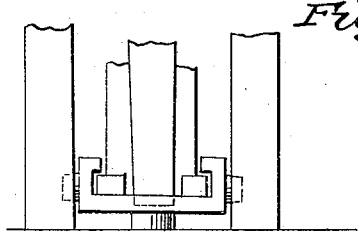

C C are auxiliary wheels, revolving on fixed spindles, D D, and arranged in an inclined position, as shown in fig. 2. The tread of the auxiliary wheels is grooved, the bevel of the walls of the channel being such that at the under side of the wheel the outer wall rests squarely on the tread of the rail, as seen at $c$, while the inner wall stands vertically alongside of the inner edge of the rail, as seen at $c^1$, and at the upper side of the wheel the inner wall is horizontal, as seen at $c^2$, while the outer wall is nearly or quite vertical, as shown at $c^3$.

The spindles D D are supported by two plates or beams, G G', of iron, being made larger between the plates than are their extremities, which pass through the plates, and having square shoulders, on which the plates rest, in order that, however tightly the latter may be screwed together by means of the nuts $a\ a$, they will bear only against the shoulders, $d\ d$, of the spindles, and never interrupt the action of the wheels that run on the spindles. In connection with the wheels C C, two other wheels, F F, running on vertical spindles, similar in construction to those of the inclined wheels, operate in a horizontal position between the plates G G, and in a line between the upper edges of the inclined wheels. The faces of these wheels are not grooved. They are arranged, as shown in fig. 1, to run with the under edge of their rims resting on the horizontal wall, $c^2$, and their perimeters bearing against the nearly vertical walls $c^3\ c^3$. In order that they may never cease to press against the inclined wheels in the manner described, by reason of wearing down, or from any other cause, their spindles are set in slots, $g\ g'$, in the plates G G', by which they can be adjusted towards or from the inclined wheels, at pleasure. These wheels are for the purpose of bracing and supporting the grooved wheels, in time of great upward or downward pressure.

The ends of the plate G are fixed to or have cast upon them upright slotted guides, $h\ h$, which slide up and down in a grooved block, H, on either side of the car, thus allowing the whole device or auxiliary truck, consisting of the plates G' G', wheels C C, F F, and their connections, to slide vertically.

When, from any unevenness of the track, or from any obstructions on it, the main wheels rise or bounce, carrying the body of the car with them, the auxiliary truck does not bounce with the car, but continues in position on the track.

To assist it in maintaining its position, I attach a stout spring, J, extending across the whole width of the truck, as seen in fig. 2, its ends resting in the fixed block H, and its centre passing near the upper side of the plate G, and resting on a block, E, where a stout bolt, I, passes from the plate up through an aperture in the spring, and terminates in a head, $i$. The spring, resting on the block E, presses the auxiliary truck down, holding the grooved wheels firmly on the track, and the bolt I guides the motion of the spring, and allows the truck to operate up and down easily and quickly.

The guide-blocks H H are supported, and allowed a slight rocking motion, by means of pivots or journals, M M, working in elongated bearings or slots in the cross-beams A' A'. The purpose of elongating the slots horizontally is to allow the whole auxiliary truck to yield slightly in a lateral direction. In order to prevent any violent or uncomfortable jar resulting from this, and, at the same time, to allow the truck to yield to the motion of the car in passing a curve in the road, I interpose rubber springs or cushions, *e e*, between the ends of the auxiliary truck and the inner sides of the car-frame.

By this means, the auxiliary truck, while holding its running-wheels firmly on the track, yet allows an easy motion to the car, the truck being constructed so as to yield as much as is required in every direction.

The grooved wheels are intended to run tightly between the rails, having no play, as the other wheels have, between the rails, where the latter are properly laid.

The object in thus adjusting the wheels C C is that in case the track should spread a little, still, when the cars move sideways, the grooved wheels would reach the track before the main wheels, and would thereby control them. The rubber springs *e e* would at the same time yield proportionately to the pressure, and to the extent that the builder of the car designed in adjusting them in place.

Among the many advantages secured by this apparatus, in addition to those already set forth, may be mentioned the following:

The auxiliary wheels are so shaped that they cannot climb the sides of the rails, and so applied that they prevent the flanges of the main wheels from grinding against the track, especially at curves in the road. Besides this, being on independent axles, they do not themselves twist or grind upon the rails in passing curves, thereby preventing, not only great wear upon the rails and danger of breaking axles, but the waste of a great deal of power.

Again, if the car should actually jump the track, it will be almost impossible for it to pull off the car next behind it, as the couplings would break long before the safety-trucks would yield, if they were properly constructed.

In addition to these advantages, it may be mentioned that the form of the spindles D D is such that they may be chambered, and serve as oil-cups, the proper apertures being made from the chambers within them to the bearing-surface on which the wheels run. Being thus formed, they may be provided with wicks, or any other suitable means for properly conveying and applying the oil.

Having thus described my invention, what I claim as new, and desire to secure by Letters Patent, is—

1. The combination of the inclined grooved wheels C C with the horizontal bracing-wheels F F, substantially as and for the purpose set forth.

2. The spring J, in combination with the sliding plate G, and fixed plate or block H, substantially as and for the purpose set forth.

3. An auxiliary truck, provided with inclined wheels, C C, and bracing-wheels, F F, and sliding vertically in guides H H, in the manner and for the purposes indicated.

4. The combination of the plates G G' with the wheels C C, F F; the spindles D D, having shoulders *d d*, and the nuts *a a*, substantially as and for the purpose specified.

5. The guide-blocks H H, when supported by pivots M M, working in elongated bearings, in the manner and for the purposes described.

6. The rubber cushions *e e*, when used in combination with the auxiliary safety-truck above described, in the manner and for the purposes specified.

S. Y. BRADSTREET.

Witnesses:
  M. M. MOULTON,
  J. P. HUSTON.